United States Patent Office

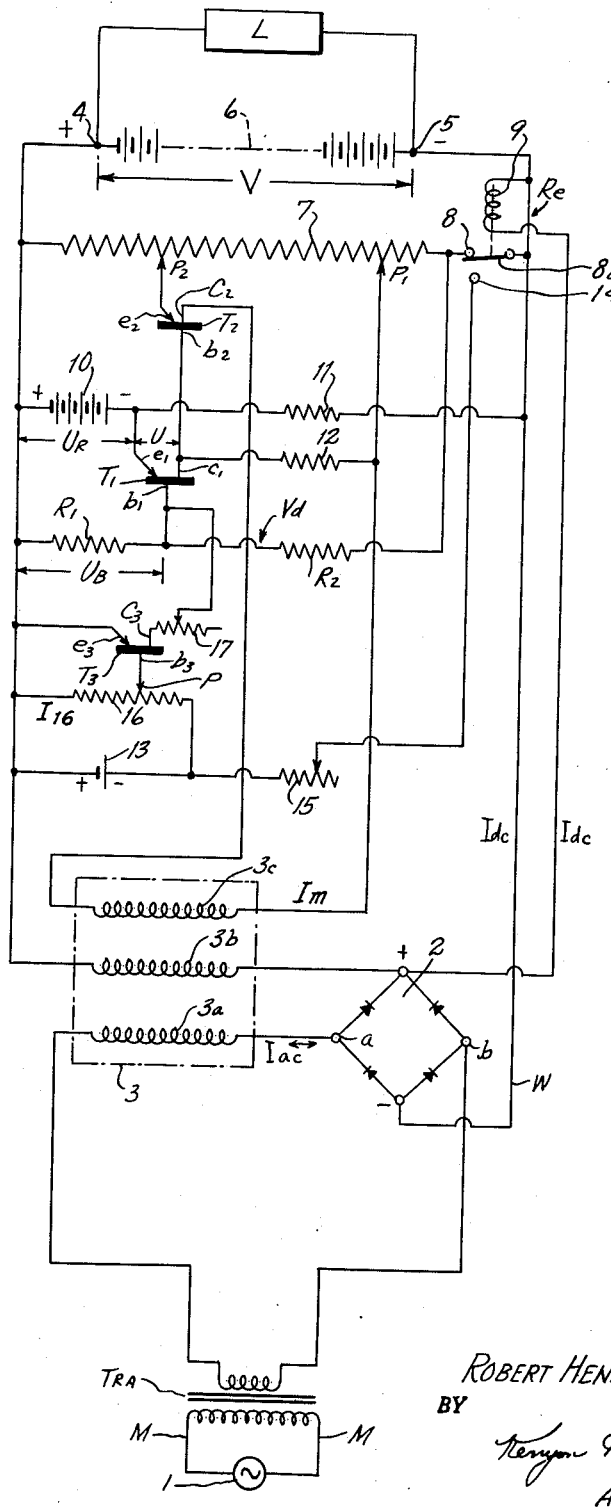

3,040,182
Patented June 19, 1962

3,040,182
DIRECT CURRENT VOLTAGE GENERATORS SUPPLIED BY AN ALTERNATING CURRENT POWER SOURCE
Robert Henri Lapuyade, Paris, France, assignor to Societe des Accumulateurs Fixes et de Traction (Societe Anonyme), Seine, France, a company of France
Filed Sept. 1, 1959, Ser. No. 837,375
Claims priority, application France Sept. 12, 1958
14 Claims. (Cl. 307—66)

This invention relates to direct current voltage generators supplied by an alternating current power source so connected to a load that the load may be operated alternatively either by the direct current generator or by a battery during periods of power failure of the A.C. source, and more particularly to a system which provides for quick restoration to charged state of the battery after the occurrence of an A.C. power failure, and upon the resumption of A.C. power after such failure at a high charging rate proportioned to the time duration of the power failure, so that the battery will be capable of resuming its full load supplying function without danger of complete discharge even if another A.C. power failure occurs a short time after the initial power failure.

D.C. voltage generators having a substantially constant voltage are already known, such generators constituting a rectifying apparatus supplied by an alternating current, and having a storage battery across its terminals, which storage battery gives the desired constancy to the direct current output voltage, and ensures the continuity of the direct current output in case of failure of the alternating current supply.

In such generators it is usual, in order to compensate for the fluctuations of the alternating voltage supply or in order to taken into account the charged state of the battery (so that the said battery is not put in a permanent overcharged state), to add a regulating device so that the direct current voltage is substantially constant at the output terminals of the rectifier.

In normal use, when the direct current is taken from such a generator by a load, the rectifier and the parallelly connected battery, both supply current to the load. When, however, the alternating current power supply is interrupted as by mains failure or for any other reason, the battery alone supplies power to the load and it, of course, discharges progressively. The discharge characteristic of a storage battery (output voltage as ordinate axis versus discharge time as abscissa axis) is a line substantially parallel to the time axis or sloping very slightly for the most part of its length for a correctly made battery. Thus, when the alternating current supply is reestablished, the conventional regulator which operates as a function of the voltage of the battery but not of its state of charge, brings about a decrease of the rectifier output rate and prevents the battery from being restored quickly to its normally charged state.

If there is a risk of another failure of the A.C. supply, a short time after the first one and such additional failure or failures occur, the battery may eventually be completely discharged. This is particularly dangerous in safety plants.

The present invention has among its principal features and objects the obviation of this serious drawback by ensuring the recharge of the battery at a high rate, after any A.C. failure, during a time proportioned to the duration of any particular failure that may occur.

To this end, according to the invention a relay, when energized normally by the existence of A.C. power and preferably by the output current of the D.C. generator, connects the regulator in the load-battery-generator circuit through a first or working contact and, through a second normally idle contact is able to connect a reference storage cell across the terminals of the battery upon failure of A.C. supply. The said cell has preferably a low capacity and a lower rated voltage than the battery, and is shunted by a resistor, one terminal of the closed shunt circuit constituted by the said cell and the said resistor, being connected to the regulator so that it may act upon the latter in such a way that the rectifier output rate is increased when the said terminal is at a non null potential.

Thus, when the A.C. power supply fails, the relay becoming de-energized and opening the circuit through the working contact and making the circuit through the idle contact acts to disconnect the regulator and to connect the low capacity cell across the battery terminals and maintains this condition during the period of A.C. power failure. Said cell thus receives a charge during this period substantially proportional to the duration of the failure. When the A.C. power supply is reestablished the relay is again energized to restore the circuit through the working contact and open that through the idle contact. The charge of the cell is thus interrupted and the said cell discharges through the resistor in shunt with it, thus increasing the potential of the shunt discharge circuit terminal which is connected to the regulator (again in the circuit), during a period equal to the discharge time of the said cell, said time being proportional to the charge the cell has received during A.C. power failure and, therefore, proportional substantially to the time duration of the failure. During this cell discharge time, the regulator, influenced by the potential of the said shunt discharge circuit terminal causes an increase of the rectifier output rate, which allows the load supplying battery to be charged quickly.

When the cell is completely discharged, the potential of the shunt circuit discharge terminal connected to the regulator becomes null and the said regulator which stays in the circuit, returns to its normal function of preventing permanent overcharge of the load feeding battery.

The apparatus embodying the invention may be adapted for use with every regulator which may be monitored by a voltage change (directly or amplified) applied to a monitoring device which is either electric, or electromagnetic, or of other known types.

More especially it is known that the regulation may be obtained by comparing the voltage of a reference element with the voltage taken at the rectifier output terminals through a voltage divider and, by acting upon the charging power source output rate according to the difference between the compared voltages.

The comparing device may advantageously consist of a triode and more particularly a semi-conductor triode (transistor) in which the reference voltage and the fraction of rectifier voltage which is compared to it polarize two of the input electrodes of the said triode (the emitter and the base in the case of a transistor), the output current of the said triode, eventually after an amplification, acting upon an organ regulating the power source output rate.

Moreover, the said regulating organ may advantageously consist of a transducer comprising three windings, namely, a variable impedance winding through which the alternating current flows, a self-excitation winding through which the rectified current flows and a monitoring winding through which the regulating or monitoring current flows. Due to the self-excitation of the said transducer, a relatively low monitoring current may modify the magnetization of the said transducer magnetic circuit in the vicinity of its saturation point and thus cause large variations in the impedance of the variable impedance winding through which the alternating current passes, and by way of consequence, the rectified power output current.

It is not, however, possible to suppress the rectifier output current completely by giving an infinitely high value to the variable impedance. Thus even when no current is taken from the generator, the load supplying battery is still being charged and subject to a permanent overcharge state. This may have a deteriorating effect.

To obviate this drawback, it is known to connect a ballast resistor across the battery terminals, said resistor being intended to absorb the transducer permitted residual D.C. output current at that state when the variable impedance is at maximum value.

Such a ballast resistor through which it is known, practically constant current flows during normal service, is used for polarizing the various elements of the regulating device by means of taps. This use of a ballast resistor, however, does not relieve the problem of restoring the battery to a charged state quickly after an A.C. power failure has occurred so that recurrence of failure a short time after the restoration from the first failure may find the battery so far discharged by reason of its load supplying function during the period of first failure as to be either useless or nearly so for similar function during the second or succeeding failures.

In the present invention the problem is solved by the use of the relay hereinbefore mentioned. Its first or working contact is series-connected to the ballast resistor and when the relay is de-energized, the breaking of the circuit at this contact puts the regulating device out of the circuit and, moreover, disconnects the ballast resistor and prevents the battery from feeding power uselessly to the ballast resistor which is capable of absorbing a substantial current.

Moreover, on de-energization of the relay as by A.C. power failure the second or idle contact establishes a circuit between the load supplying battery and the cell to charge the latter. Also the hereinbefore mentioned terminal of the shunt discharge circuit of the low capacity storage cell or battery is connected to the monitoring electrode of an electronic valve of the triode type, connected across that part of the hereinbefore mentioned voltage divider which determines the load battery voltage fraction compared to the reference element voltage.

Thus, when after an interruption or failure of the alternating current power supply, the said supply is re-established, the electronic valve is liberated, i.e., becomes conducting under influence of the charged cell during a time proportional to that of the duration of interruption, so that, during this time, a lower resistance is substituted for that part of the voltage divider which determines the voltage fraction compared to the reference element voltage. This results in an increase of the difference with the reference voltage, thus causing the regulator to increase the rectifier output current so that the battery is during this period charged at a higher rate than it could be charged by use of the regulator alone.

The electronic valve advantageously consists of a semiconductor triode (transistor preferably of the p-n-p type), which may be monitored by slight potential changes, so that it is possible on the one hand to use directly (i.e., without amplification) the potential changes of the point of the shunt discharge circuit for monitoring the said triode (transistor), and on the other hand to use a small number of cells, and even only one for the low capacity storage battery or cell.

Lastly, the end of the voltage divider corresponding to the end of the ballast resistor connected to the first or working contact of the relay is also connected to the said working contact, so that disconnection of the relay also removes the voltage divider from the circuit and during power failure prevents the battery from supplying a useless current into the voltage divider when the battery alone is functioning.

The following description related to the annexed drawings given as a non-limitative example will help in understanding how the invention may be realized, the characteristics which may be deduced both from the drawings and the description being of course part of the said invention.

Other objects and features of the invention will become apparent from the following detailed description and the accompanying drawing wherein:

The only FIGURE is a circuit diagram of a plant for a regulated D.C. voltage generator for use to feed a load and supplied by A.C. voltage.

On this diagram an A.C. voltage source 1, via the mains M, and if need be through an intermediate transformer TRA for adapting the A.C. voltage of the source to the particular installation, energizes the rectifier bridge 2 through the winding $3a$ of the transducer 3 by connection to the input terminals $a$ and $b$ of the bridge. The positive (+) and negative (−) output terminals of the rectifier bridge 2 are connected so that the rectified current is brought to the terminals 4 and 5 of the battery 6 respectively through the self-excitation winding $3b$ of the transducer 3 and through conduit W. The terminals 4 and 5 of the battery are also connected to the load L. The terminals 4 and 5 of battery 6 are also parallelly-connected to the ballast resistor 7, one end of said resistor being directly connected to terminal 4 and the other end being series-connected via the working contact 8 of a relay $Re$ whose energizing winding 9 is connected to the positive output terminal of the rectifier bridge 2, so that the said relay winding 9 is always energized when the A.C. source 1 is functioning. The movable blade $8a$ of the relay $Re$ is in circuit closing condition with respect to working contact 8 as long as winding 9 is energized.

A voltage divider $Vd$ comprising resistors $R_1$, $R_2$ is also connected across the terminals 4 and 5 of the battery through the contact 8 during energized states of winding 9.

The resistors $R_1$ and $R_2$ of the voltage divider $Vd$ determine the fraction of the voltage between terminals 4 and 5, which is applied to the base $b_1$ of a first transistor $T_1$. The emitter $e_1$ of this transistor is biased by the reference voltage $U_R$, which is preferably that of an electrolytic cell 10 (advantageously gas-tight) of conventional type maintained in a permanent overcharged state by being connected serially through the resistor 11 and the self-excitation winding $3b$ across the (+ and −) output terminals of the rectifier 2. The collector $c_1$ of the transistor $T_1$ is biased via a tap $P_1$ of the ballast resistor 7 through the resistor 12. This collector $c_1$ is connected to the base $b_2$ of a second transistor $T_2$, the emitter $e_2$ of which is biased via the tap $P_2$ of the resistor 7. The collector $c_2$ of this second transistor $T_2$ is connected to the tap $P_1$ through the monitoring winding $3c$ of the transducer 3 which determines the bias of this collector.

The functioning of this portion of the apparatus without the relay is only described for convenience as it is conventional. The relay $Re$ with its contact 8 and energizing winding 9 which as has been described above is connected so that the circuits through the contact 8 are maintained closed (when the A.C. source 1 is energized) is a novel aspect of this invention.

Preferably the transistors $T_1$, $T_2$ and a third transistor $T_3$ (the latter connected as will be described) are of the p-n-p type. As noted, however, above other types of triode semi-conductors may be used and their use is contemplated. The transistors may be any of the suitable known types described, for example in "Transistor Electronics" by Lo, Endres, Zawels, Waldhauer and Cheng (Prentice-Hall, Inc., 1955). Also "cryistors" a product of General Electric Co. may be used.

The conductivity of the transistor $T_1$ depends on its polarization, i.e. on the difference between the voltage $U_B$ (which is the fraction $$V \cdot \frac{R_1}{R_2 + R_1}$$

of the voltage V between the terminals 4 and 5 of battery 6) which biases its base and the substantially constant reference voltage $U_R$ e.g. of the electrolytic cell 10.

If the difference between $U_B$ and $U_R$ ($U_B - U_R$) is slight, null or even negative (the latter when battery 6 is completely discharged), the resistance between the emitter electrode $e_1$ and the collector electrode $c_1$ is high and the voltage drop U between these electrodes is high. In these conditions, the bias on the base $b_2$ of the transistor $T_2$ (which amounts to $U_R + U$) is higher than the potential provided by tap $P_2$ and the transistor $T_2$ then allows current $I_m$ to flow through it and the monitoring winding $3c$. This magnetizes the transducer 3, and in consequence decreases the impedance of transducer winding $3a$ and increases the charging or output current I delivered by the rectifier 2.

On the contrary, when the voltage $U_B$ increases (caused by a condition of fully charged battery 6 and/or eventually excessive charging supply voltage from the output of rectifier 2), the circuit portion between emitter electrode $e_1$ and collector electrode $c_1$ of transistor $T_1$ becomes more conductive, U then decreases and because $U_R + U$ has a lower value the polarization of the transistor $T_2$ decreases, thus increasing the resistance of the circuit portion between emitter electrode $e_2$ and conductor electrode $c_2$ of said transistor $T_2$. This decreases the current $I_m$ in the monitoring winding $3c$ of the transducer 3 and demagnetizes the said transducer. The impedance of the winding $3a$ then increases and the rectifier yields a lowered charging or output current I.

For the minimum value (practically null) of the monitoring current $I_m$ flowing through the winding $3c$, a certain amount of residual charging or output current I is still yielded by the rectifier; this residual current $I_{Res}$ is absorbed by the ballast resistor 7, the value of which is chosen to be exactly equal to the quotient of the rated voltage of the battery 6 and the said residual charging or output current, i.e., $$\frac{V}{I_{Res}} \quad \begin{array}{l} \text{(rated voltage of battery 6)} \\ \text{(residual charging or output current when } I_m \text{ has minimum value)} \end{array}$$

Thus, the charging or output current I always is monitored by the difference between $U_B$ and $U_R$ which is small, even when the storage battery 6 is partially discharged, due to the known practically straight line of the discharge characteristics of such storage batteries as has been mentioned above.

After the occurrence of an A.C. supply failure, the battery 6 should be recharged very quickly, so that if another failure occurs shortly after the restoration from the first one, a high quantity of energy will be found accumulated in the battery 6 to meet the new emergency. Unless there is a quick restoration in the battery of a major part at least of its charge depletion as caused by the load feeding use of the battery for the duration of the first A.C. power failure, the resumption of A.C. power particularly if the duration of failure has been long, may find the residual charge of the battery too low to enable the battery to feed the load at all or effectively for any significant time without complete failure of the battery should a new A.C. power failure occur shortly after said first resumption of A.C. power. This problem is not corrected by the monitoring action of the regulating device comprising the transistor $T_1$, the voltage divider $Vd$, the reference voltage 10, the ballast resistor 7 and associated components which, as has been described, function primarily to prevent overcharge conditions in the battery during normal A.C. operation. To solve the problem according to the invention, a low capacity cell 13 is connected across terminals 4 and 5 of battery 6 via the series contact 14 of the relay $Re$. This contact 14 as mentioned, is in open circuit state as long as relay coil 9 is in an energized state, i.e., while A.C. current supply is being maintained.

The adjustable current limiting resistor 15 is serially connected between the cell 13 and contact 14. The cell 13 is parallel (shunt) connected to the discharge resistor 16. A tap P in this shunt resistor 16 is connected to the base electrode $b_3$ of a transistor $T_3$, the emitter electrode $e_3$ of which is connected to the battery terminal 4 and the collector electrode $c_3$ of which is connected to the base electrode $b_1$ of the transistor $T_1$ serially through the adjustable resistor 17.

The cell 13 is preferably a small or miniature gas-tight alkaline storage cell (e.g. of the button type, for example, but without limitation thereto of the type described in a co-pending application of Societe des Accumulateurs Fixes et de Traction (Societe Anonyme), Serial No. 711,263, filed January 27, 1958) which has a high charging efficiency of practically 100% for a suitable charging current, which means that, at the same rate, the discharge time is very nearly the same as the charge time. Other gas-tight storage cells or batteries having equivalent characteristics also may be used.

The operation of this arrangement is as follows: When the A.C. supply by source 1 is interrupted, the relay coil 9 is de-energized and the contact plate $8a$ of this relay moves from contact 8 to contact 14. The whole regulating apparatus (comprising the voltage divider $Vd$ with its resistors $R_1$, $R_2$ and ballast resistor 7 as well as reference voltage 10) is put out of the circuit and the battery 6 alone supplies power to the load L. At the same time the battery 6 charges the cell 13 via contact 14 and resistor 15. A low current $I_{16}$ is then present in the shunt resistor 16. When the A.C. power supply is re-established the accumulator cell 13 discharges in the shunt resistor 16. As a result the potential of tap P (a point in said shunt resistor), and by way of consequence, the potential of the base electrode $b_3$ becomes higher than the potential of the emitter electrode $e_3$, so that the transistor $T_3$ becomes conductive. The hereinbefore described normal bias of the transistors $T_1$ and $T_2$ having been re-established by the closing of contact 8 (due to re-energization of relay coil 9 by restored A.C. power), the now conductive transistor $T_3$ puts the resistor 17 in a parallel circuit across the terminals of the resistor $R_1$, so that it polarizes the electrode base $b_1$ of transistor $T_1$. This condition persists as long as the transistor $T_3$ remains conductive, i.e., as long as the discharge of the low capacity cell 13 continues. The net resistance of the part $R_1$ of the voltage divider $Vd$ now in parallel-connection with the circuit $e_3$, $c_3$ of transistor $T_3$ and resistor 17 is lower than that of $R_1$ alone. The voltage $U_B$ is then, therefore, very much lowered (in simulation of a condition wherein the battery 6 is greatly discharged). Then due to the operation of transistor $T_2$ and transducer 3, the charging rate of the output current I of the rectifier 2 is maximum. In other words, a high intensity current I therefore then charges the battery 6.

As soon as the cell 13 becomes discharged, in such circumstances, the potential of the tap or point P of shunt resistor 16 becomes lower than the potential of the emitter electrode $e_3$. The transistor $T_3$ then becomes practically non-conductive. This cuts out the effects of resistor 17 on voltage divider resistor $R_1$ and the usual regulation of charging controlled by the components including the voltage divider $Vd$ its resistors $R_1$, $R_2$ and transistors $T_1$ and $T_2$ battery 10 and resistors 11 and 12 goes on while the voltage divider $Vd$ then operates normally as hereinbefore described primarily to regulate or compensate for fluctuations in A.C. voltage supply and prevent placing the battery in a permanent overcharged state.

Thus, by use of cell 13 the time of the high rate charge of the batery 6 is equal substantially to the time of the discharge of the cell 13 which, in turn, is proportional to the time during which it has been charged and therefore to the length of time of the A.C. power supply failure.

In the embodiment shown, the winding 9 of the relay is connected across the + and − rectifier output terminals, and it is therefore possible for relay Re to be a D.C. relay. It would be less advantageous but still possible to use an A.C. relay and to connect the energizing coil of such a relay across the A.C. input terminals. In such event failure of A.C. supply again would also cause necessary switching motion of a relay arm like arm 8a from a contact like contact 8 to a contact like contact 14.

In the description hereinabove presented, the reference element 10 is conveniently an electrolytic gas-tight storage cell or battery, for example, one made according to the teachings of Jeannin Patent 2,646,455. It may be any other type of conventional storage cell or battery having similar characteristics.

Likewise, although the semi-onductor triodes $T_1$, $T_2$ and $T_3$ in the embodiment shown have been described as being preferably transistors of the kinds mentioned hereinabove, other semi-conductor triodes may be substituted. For example, conventional vacuum tube triodes (cathode, grid and anode) with selected parameters for their operation in a manner well known in the art may be utilized in replacement of the said transistors. Likewise the more recently developed semi-conductor triodes known presently as "Cryistors" may be adopted for use in place of the transistor type triodes.

The storage cell 13 is preferably as mentioned hereinabove of the miniature or button type of sealed storage cell having relatively low capacity and very small size and high charging efficiency. Such a cell or battery 13 is described in a co-pending application of Societe des Accumulateurs Fixes et de Traction (Societe Anonyme), Serial No. 711,263, filed January 27, 1958. Other low capacity, small-sized preferably sealed cells having like operational characteristics extant may of course be utilized.

It is well understood that modifications may be effected in the embodiments which have been described within the scope of the appended claims more especially by substituting technically equivalent means, without departing from the spirit of the invention. There is no intention, therefore, of limitation to the exact disclosures herein made.

What is claimed is:

1. That improvement in load supplying systems wherein the load is suppliable alternatively by either D.C. derived from an A.C. power source by rectification or a battery upon occurrence of A.C. power failure comprising rectifier means connected to the A.C. source and the battery, regulatory means connected to the rectifier means and the battery, both said means being dependent upon existence of a A. C. power supply to effect charging of the battery and its maintenance in a power supplying state for its use as a load supplier upon occurrence of an A.C. power failure, and ampere hour gauge means connected to said rectifier means and responsive to the occurrence of A.C. power failure to effect a monitoring current increasing action on the regulatory means so that an increase in D.C. output from rectifier means to the battery occurs upon restoration of A.C. power after a failure thereof has occurred to effect high rate charging of said battery as a function of the time duration of said power failure and thereby to prevent exhaustion of the battery into the load should A.C. power failure again occur even shortly after A.C. power has been restored.

2. The improvement of claim 1 wherein said ampere hour gauge means includes a multi-contact relay, an energizing coil and a switching member selectively engageable with one contact of the relay when said coil is energized and with another contact when said coil is de-energized as a result of A.C. power failure.

3. The improvement of claim 1 wherein said ampere hour gauge means includes a multi-contact relay, an energizing coil and a switching member selectively engageable with one contact of the relay when said coil is energized and with another contact when said coil is de-energized as a result of A.C. power failure, and wherein energization of said coil is by D.C. current derived from said A.C. power source.

4. The improvement of claim 1 wherein said regulatory means comprises a triode of which two input electrodes are respectively biased by a reference voltage and a voltage fraction determined by a voltage divider of the D.C. voltage of the battery, and wherein said ampere hour gauge monitoring means includes a reference cell, a discharge circuit therefore, an electrode valve of the triode type having a monitoring electrode and a circuit connecting a terminal of said discharge circuit to a terminal of the voltage divider determining the voltage fraction which is compared to the reference voltage.

5. The improvement of claim 1 wherein said regulatory means comprises a transducer, a ballast resistor connected across terminals of the battery so as to absorb residual current of the said transducer when its impedance is at a maximum, and wherein said ampere hour gauge means responsive to A.C. power failure comprises a relay having a contact connected to the ballast resistor so that the battery is disconnected therefrom whenever said relay is deactivated as a result of A.C. power failure.

6. The improvement of claim 1 wherein said regulatory means includes a voltage divider.

7. The improvement of claim 1 wherein said regulatory means includes a semi-conductor triode.

8. The improvement of claim 7 wherein said semi-conductor triode is a transistor.

9. The improvement of claim 1 wherein said ampere hour gauge means responsive to A.C. power failure includes a low capacity cell.

10. The improvement of claim 9 wherein said cell is a gas-tight storage cell.

11. The improvement of claim 1 wherein said rectifier means has input terminals connected to the A.C. power supply source and output terminals, and wherein said ampere hour gauge means responsive to the occurrence of an A.C. power failure to effect a monitoring action of said regulatory means includes a relay energizing coil connected to said rectifier means so that its energization exists only while A.C. power source is active.

12. The improvement of claim 11 wherein said coil is connected directly to the rectifier output terminals.

13. In a load supplying system suppliable either by a storage battery or D.C. derived from an A.C. source, a load, a D.C. voltage generator fed by an A.C. power source and connected to the load, a battery also connected to the load and intended primarily to supply the load upon failure of A.C. power supply to the D.C. voltage generator, a relay having an energizing coil, a first contact, a second contact and a switching member engageable with the first contact when the coil is energized and with the second contact when the coil is de-energized, said coil being connected for energization only when the A.C. power supply is operating, a regulating device and circuits connecting said device to said first contact so that controlled D.C. output to the load and battery is effected during operative periods of A.C. power supply, a reference cell having a low capacity and lower rated voltage than said battery, a resistance in shunt circuit with said cell, a circuit conecting said cell and resistance to the second contact, a selected point of the shunt circuit being connected to the regulating device, so that when said switching member moves away from the first contact into engagement with the second contact upon occurrence of A.C. power failure monitoring action on said regulating device occurs to effect increase of the output rate of the D.C. generator whenever said point is at a potential other than null.

14. For use in connection with a load suppliable with D.C. current alternatively either by D.C. derived from an alternating current source or by a battery on failure of the A.C. source, a D.C. voltage generator supplied by the A.C. source, said generator comprising a rectifier having input terminals connected to the A.C. source and having output terminals connected to the load and to the battery terminals, a regulating device dependent upon the battery voltage and being operable responsively as a function of change of voltage to control the output current delivered by the generator, a relay having an energizing coil, a first relay contact maintainable in circuit closing condition during energized states of said coil, and a second relay contact requiring de-energization of said coil for establishment of a circuit closing condition, said first relay contact serving during energized states of said coil to maintain controlled output from the rectifier by action of said regulating device, de-energization of said coil effecting deactivation of the circuits connected to said first named contact and establishment of circuits via said second contact, said last named circuits including a reference cell having a low capacity and a lower rated voltage than said battery, and a resistor in shunt circuit with said cell, a selected point of the shunt circuit being connected to said regulating device to effect monitoring action thereon so that the regulating device will effect increase of the output rate of the rectifier when said point is at a potential other than null.

References Cited in the file of this patent

UNITED STATES PATENTS

| | | |
|---|---|---|
| 1,882,473 | Beetem | Oct. 11, 1932 |
| 1,953,602 | Hanley | Apr. 3, 1934 |
| 2,898,483 | Muller | Aug. 4, 1959 |
| 2,917,640 | Batterman et al. | Dec. 15, 1959 |